(12) United States Patent
Smith et al.

(10) Patent No.: US 10,840,741 B2
(45) Date of Patent: Nov. 17, 2020

(54) WIRELESS POWER MULTIPLE RECEIVE COIL SELF-STARTUP CIRCUIT FOR LOW BATTERY CONDITION

(71) Applicant: Integrated Device Technology, Inc., San Jose, CA (US)

(72) Inventors: Nicholaus Wayne Smith, La Mesa, CA (US); Tao Qi, San Diego, CA (US); Jiangjian Huang, San Jose, CA (US); Chan Young Jeong, San Jose, CA (US); Gustavo James Mehas, Mercer Island, WA (US)

(73) Assignee: Integrated Device Technology, Inc., San Jose, CA (US)

( * ) Notice: Subject to any disclaimer, the term of this patent is extended or adjusted under 35 U.S.C. 154(b) by 46 days.

(21) Appl. No.: 16/369,523

(22) Filed: Mar. 29, 2019

(65) Prior Publication Data

US 2019/0356167 A1     Nov. 21, 2019

Related U.S. Application Data

(60) Provisional application No. 62/650,861, filed on Mar. 30, 2018.

(51) Int. Cl.
*H02J 50/12*     (2016.01)
*H02J 7/02*      (2016.01)
*H01F 38/14*     (2006.01)
*H04B 5/00*      (2006.01)

(52) U.S. Cl.
CPC ............. *H02J 50/12* (2016.02); *H01F 38/14* (2013.01); *H02J 7/025* (2013.01); *H04B 5/0037* (2013.01); *H04B 5/0081* (2013.01)

(58) Field of Classification Search
CPC . H02J 50/12; H02J 50/10; H02J 7/025; H04B 5/0037; H04B 5/0075; H04B 5/0087
USPC ......... 307/104; 320/107, 108, 110, 111, 112, 320/114, 115, 137
See application file for complete search history.

(56) References Cited

U.S. PATENT DOCUMENTS

| | | | |
|---|---|---|---|
| 2016/0261134 A1* | 9/2016 | Wu | H02J 7/025 |
| 2018/0269728 A1* | 9/2018 | Liu | H01F 38/14 |
| 2019/0065937 A1* | 2/2019 | Nowatzyk | H04L 45/28 |
| 2020/0161907 A1* | 5/2020 | Yang | H02J 50/10 |

* cited by examiner

*Primary Examiner* — Tomi Skibinski
(74) *Attorney, Agent, or Firm* — Haynes and Boone, LLP

(57) ABSTRACT

A wireless power circuit is presented that includes a transmit coil coupled to a first node; a receive coil coupled to the first node; a switch circuit coupled to the transmit coil and the receive coil opposite the first node, the switch switching the transmit coil to a second node in a transmit mode and switching the receive coil to the second node in a receive mode; a controller coupled to the first node and the second node, the controller coupled to provide signals to the switch circuit; and a self-start circuit coupled to the receive coil (or Tx coil) that automatically selects one of the coils to be used, the self-start circuit providing power to the switch circuit to hold the switch circuit in the receive mode (or predefined coil to be selected by default).

10 Claims, 3 Drawing Sheets

WIRELESS POWER MULTIPLE RECEIVE COIL SELF-STARTUP CIRCUIT FOR LOW BATTERY CONDITION

RELATED APPLICATIONS

The present disclosure claims priority to U.S. Provisional Application Ser. No. 62/650,861, filed on Mar. 30, 2018, which is herein incorporated by reference in its entirety.

BACKGROUND

Technical Field

Embodiments of the present invention are related to wireless power and, in particular, to a self-startup circuit for a wireless power receiver with a low battery condition when selection decisions cannot be made using an Application Processor (AP).

Discussion of Related Art

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The more common standard for wireless transmission of power is the Wireless Power Consortium standard, the Qi Standard. Under the Wireless Power Consortium, the Qi specification, a resonant inductive coupling system is utilized to charge a single device at the resonance frequency of the receiver coil circuit. In the Qi standard, the receiving device coil is placed in close proximity with the transmission coil while in other standards, the receiving device coil is placed near the transmitting coil, potentially along with other receiving coils that belong to other charging devices.

Typically, a wireless power system includes a transmitter coil that is driven by an inverter stage to produce a time-varying magnetic field and a receiver coil, which can be part of a device such as a cell phone, PDA, computer, or other device, that is positioned relative to the transmitter coil to receive the power transmitted in the time-varying magnetic field.

In some wireless power systems, the portable device may include electronics powered by a battery. Further, a wireless power circuit may include one or more coils to receive and/or transmit data or wireless power with other devices, including a wireless power transmitter. However, if the battery charge becomes too low, the charging circuitry may not be able to operate to charge the battery to a useful level.

Consequently, there is a need for wireless power systems that can operate to receive power and charge the battery even if the battery is discharged.

SUMMARY

In some embodiments, a wireless power circuit. In accordance with some embodiments, a wireless power circuit is presented that includes a transmit coil coupled to a first node; a receive coil coupled to the first node; a switch circuit coupled to the transmit coil and the receive coil opposite the first node, the switch switching the transmit coil to a second node in a transmit mode and switching the receive coil to the second node in a receive mode; a controller coupled to the first node and the second node, the controller coupled to provide signals to the switch circuit; and a self-start circuit coupled to the receive coil, the self-start circuit providing power to the switch circuit to hold the switch circuit in the receive mode. The switch circuit can include a transistor coupled between the receive coil and the second node, the transistor configured to conduct in the receive mode and not to conduct in the transmit mode. The transistor is powered to conduct by the self-start circuit. The transistor can be an FET transistor. The self-start circuit can include a first diode coupled to the receive coil to receive power and a second diode coupled in series with the first diode, the self-start circuit providing power from a node between the first diode and the second diode.

A method of operating a device according to embodiments of the present invention includes switching to couple a receive coil to a receive circuit with a switch; receiving power into the switch if a power source is available; and providing power from a self-start circuit coupled to the receive coil if the power source is unavailable. The switch can include a transistor coupled between the receive coil and the second node, the transistor configured to conduct in the receive mode and not to conduct in the transmit mode. The transistor is powered to conduct by the self-start circuit. The transistor can be an FET transistor. The self-start circuit includes a first diode coupled to the receive coil to receive power and a second diode coupled in series with the first diode, the self-start circuit providing power from a node between the first diode and the second diode.

These and other aspects of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

As discussed above, in some wireless power systems if the battery charge becomes too low, embodiments of the invention provide charging circuitry that is able to operate to charge the battery to a useful level. In these embodiments, the low battery condition prevents normal system control from being possible until the battery charge level is high enough to enable regular system operating, for example application processor (AP) control of the system. As a consequence of low or no battery conditions, a wireless power circuit according to some embodiments charges the battery and controls the selected coil used for charging the battery in systems implementing two coils (one for transmission and one for receipt of power).

Figure 1:
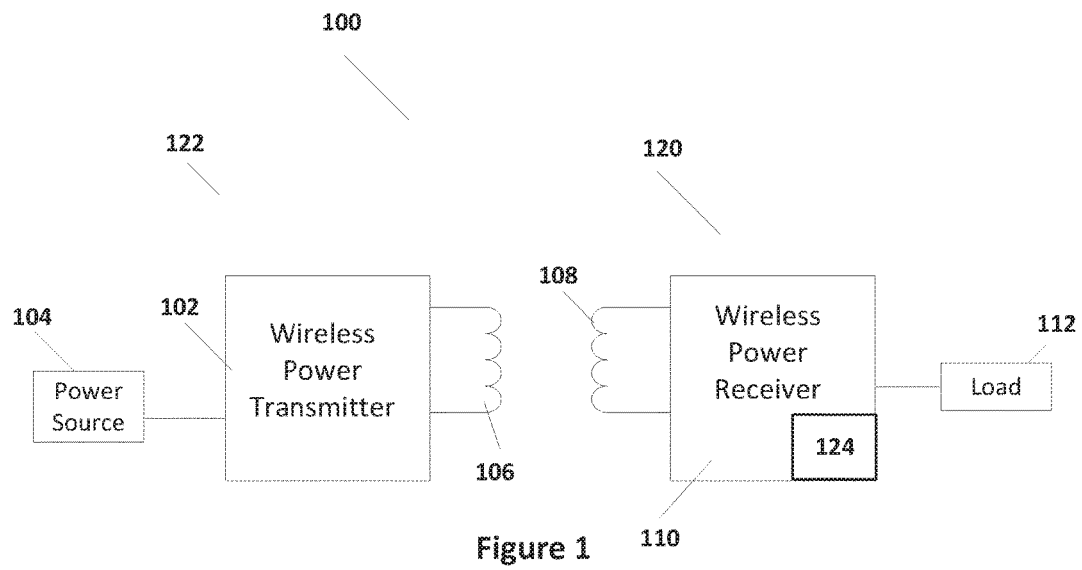
FIG. 1 illustrates a transmitter and receiver system according to some embodiments of the present invention.

FIG. 1 illustrates a wireless power system 100 with a wireless power transmitter and a wireless power receiver 110. In this example, wireless power transmitter 102 is included in a first device 122 and wireless power receiver 110 is included in a second device 120. In some cases, one or more of devices 122 and 120 can include both a wireless power transmitter and a wireless power receiver.

As is illustrated in FIG. 1, wireless power transmitter 102 receives power from a power source 104 and drives an AC current through transmitter coil 106 to produce a time-varying magnetic field. Power transmitted by transmitter coil 106 as the time-varying magnetic field is received in receive coil 108. The power signal from receive coil 108 is rectified and processed in wireless power receiver 110 and output to load 112. Load 112 can include a charger and battery, which provides power to the device that includes receiver 110 when wireless power is not provided or other system that only functions while wireless power is supplied. Embodiments of the present invention include a start-up circuit 124 in receiver 110 that provides power allowing receipt of wireless power when the battery in device 120 is discharged.

As discussed above, next generation devices, for example cell phones, may implement receive (Rx) and transmit (Tx) functions combined into a single device (e.g. a phone). To balance optimal performance with efficiency and active area, often two independent coils are provided in the device. This arrangement is often a good solution for providing both receive and transmit functions in a particular device (at the same time or one case at a time). This solution, uses a method to select between the Rx coil, which may be a default, and the Tx coil. This arrangement, for example, may be used to allow the portable device to charge a watch or other wearable device. Start-up circuit 124 can be applied to either automatically select Rx mode or Tx mode depending on functional needs or end-product requirements.

In most embodiments, only one of the Rx coil or the Tx coil is activated at a time so that one is connected the other not connected fashion. Both coils should not be simultaneously connected. The controller in the device, which can be at least partially implemented as one or more processors operating an application program (AP), can be used to enable the selection process to choose either the Rx coil or Tx coil.

However, in the case where the charge on the battery of the device is depleted, the AP cannot operate. Furthermore, the selection switches, which are often FETs that isolate the RX wireless coil from the RX wireless control circuit in a transmit mode, may prevent received power transfer from commencing in the case of a depleted battery. Consequently, embodiments of the present invention include a self-start up circuit 124 so that the Rx mode function can be wirelessly powered and the Rx coil selected even with a dead battery to begin charging the phone battery.

Figure 2:
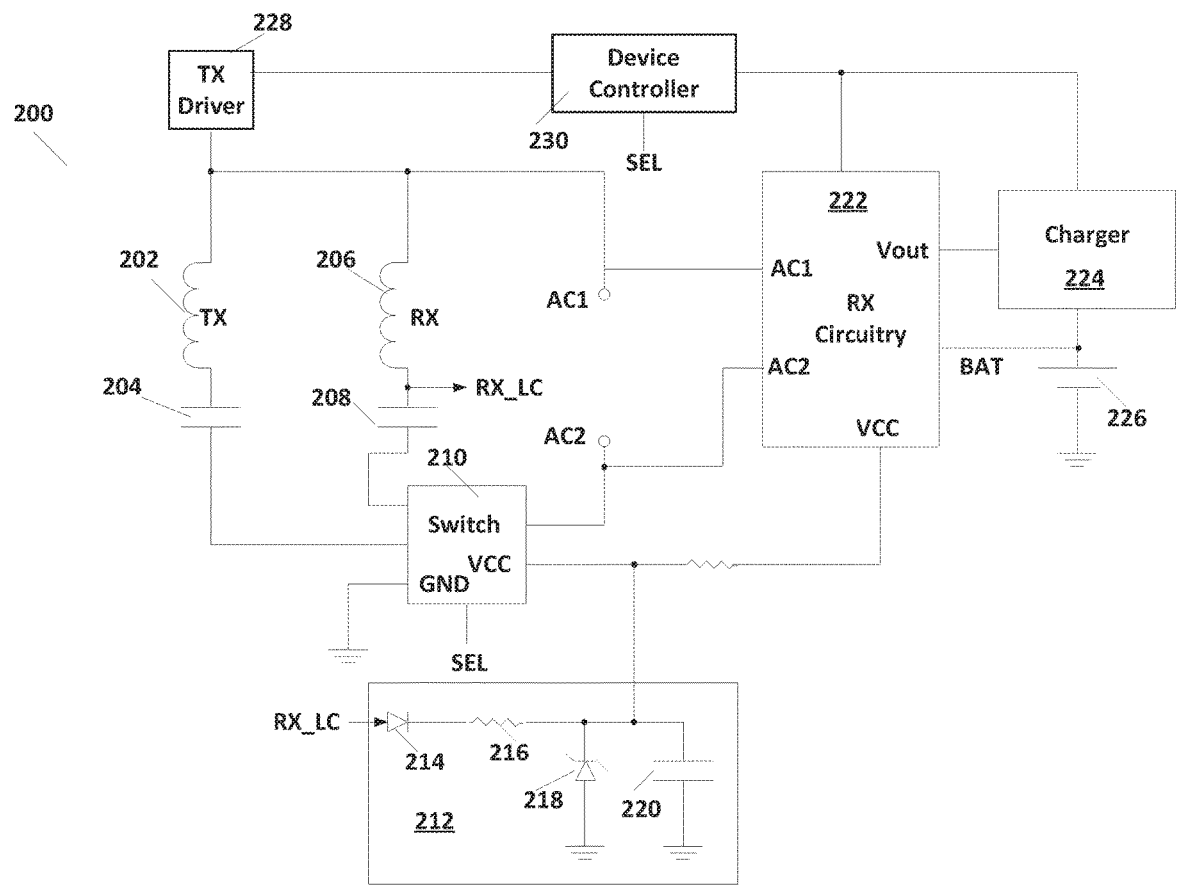
FIG. 2 illustrates a device with both a wireless power transmitter coil and a wireless power receiver coil according to some embodiments.

FIG. 2 illustrates a device 200 that includes both wireless power receiver functionality and wireless power transmitter functionality. A switch 210 selects between a transmit coil 202 and a receive coil 206. A startup circuit 212 is coupled to receive signal RX_LC from receive coil 206 and provide power to switch 210 to configure switch 210 to receive power from receive coil 206 to charge a battery 226. Consequently, power can be provided in spite of battery 226 being discharged to start receiving wireless power through receive coil 206 and start charging battery 226.

FIG. 2 illustrates a block diagram of a device 200 that includes both a transmitter and a receiver system as discussed above. As illustrated in FIG. 2, device 200 includes a transmit coil 202 and a receive coil 206. FIG. 2 illustrates an embodiment where transmit coil 202 is coupled from a node AC1 through a capacitor 204 to a switch circuit 210 and receive coil 206 is similarly coupled from node AC1 through a capacitor 208 to switch 210. However, in some embodiments, switch 210 can operate either between transmit coil 202 and receive coil 206 and node AC2 or between transmit coil 202 and receive coil 206 and node AC1. In the embodiment illustrated in FIG. 2, switch 210 couples transmit coil 202 or receive coil 206 to node AC2 in accordance with a select signal SEL. A transmitter driver 228 can be coupled to drive transmit coil 202 when device 200 is in transmit mode. In receive mode, receive coil 206 is coupled through capacitor 208 and switch 210 across nodes AC1 and AC2 in receive circuitry 222. Receive circuitry 222 is coupled to provide an output voltage to a charger 224 that charges a battery 226. Battery 226 is coupled to provide power to device 200.

In some embodiments, a device controller 230 can control Tx driver 228 and Rx circuitry 222 and indicates, through the select signal, whether device 200 is in a transmit mode or a receive mode. Device controller 230 can include processors that, at least in part, operate an AP that controls RX circuitry 222 as well as TX driver 228. Device controller 230 can be an AP or digital state machine in RX circuitry 222.

As discussed above, if battery 226 is uncharged (or not present) device controller 230 does not receive power and the switches in switch 210 are not held closed to route power from receive coil 206 to charge battery 226. Furthermore, any AP that is operating to charge battery 226 cannot operate. However, as illustrated in FIG. 2, a startup circuit 212 is coupled to provide power when battery 226 is insufficiently charged to allow receipt of power from receive coil 206 and RX circuitry 222 to provide power to charge battery 226.

RX circuitry 222, when wireless power receiver 200 is in a receive mode, receives the AC voltage from receive coil 206 between nodes AC1 and AC2, provides rectification, and provides an output voltage Vout and other voltages such as voltage Vcc. In the absence of wireless power, RX circuitry 222 can be powered by battery 226. In some embodiments, RX circuitry 222 can operate APs to receive power. However, RX 222 cannot operate the APs when battery 226 is discharged.

In the example illustrated in FIG. 2, startup circuit 212 includes a half-bridge rectifier formed by diode 214 and regulating diode 218 coupled between receive coil 206 and ground. A resistor coupled between diodes 214 and 218 provide a current source to charge capacitor 220. The node between resistor 216 and 218, to which capacitor 220 is coupled, is a power output that can be provided to VCC of switch 210 to operate switch and allow received power to be provided to RX circuitry 222.

Figure 3:
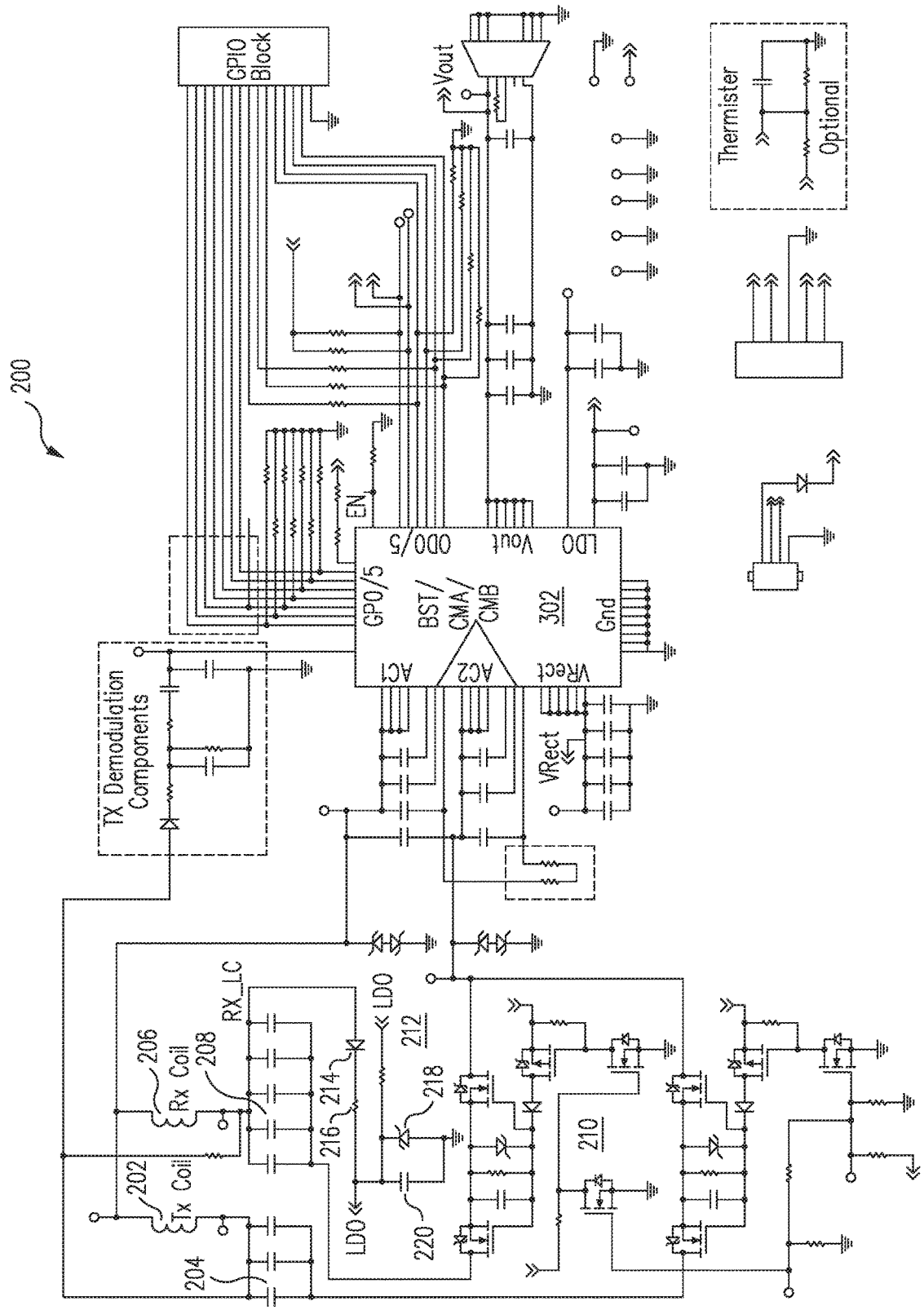
FIG. 3 illustrates an example wireless power system with a self-start circuit according to some embodiments.

FIG. 3 provides a layout of device 200 according to some embodiments of the present invention. Device 200 as illustrated in FIG. 3 illustrates a portion of the circuit illustrated in FIG. 2 in more detail. As illustrated in FIG. 3, transmit coil 202 and receive coil 206 are coupled to a wireless controller 302 through a selector switch 210. Wireless controller 302 can, for example, be an IDTP9382 wireless power controller integrated circuit. Controller 302 receives wireless power from RX coil 206 and provides power to electronics and charges batteries. Controller 222 also provides power from the batteries to drive TX coils 202 when the system is in a transmit mode. Switch circuit 210, controlled by a select signal SEL, selectively couples one of TX coil 202 and RX coil 206 to controller 302. Controller 302 includes elements from device controller 230 as well as RX circuitry 222 and may execute portions of the AP operated in device 200 to control power.

In accordance with embodiments of the present invention, self-start circuit 212 is coupled to an input of switch 210 that receives power. Self-start circuit 212 creates a method to self-start and automatically enables Rx coil 206 so that the battery of device 200 can be charged in all cases (including a dead battery condition). In the example illustrated in FIG. 3, self-start circuit 212 involves tapping off the LC (inductor-capacitor) AC (alternating current) node, labeled RX_LC in FIGS. 2 and 3, with an external diode 214, which functions to rectify the AC signal RX_LC. A zener diode or other voltage regulator 218 quickly powers the coil selection FETs in switch 210 once the transmitter provides a field that can be received by Rx coil 206. Once Rx coil 206 is powered, Rx coil 206 can hold the coil select FET in switch 210 ON for the duration of charging as necessary to provide power. Holding the RX select switch FETs ON allows the quick power up and connection of the Rx coil 206 to controller 302 with self-start circuit 212. This approach can be a very low-cost and robust method to accomplish powering controller 302 while minimizing power consumption in all power transfer cases.

Figure 4:
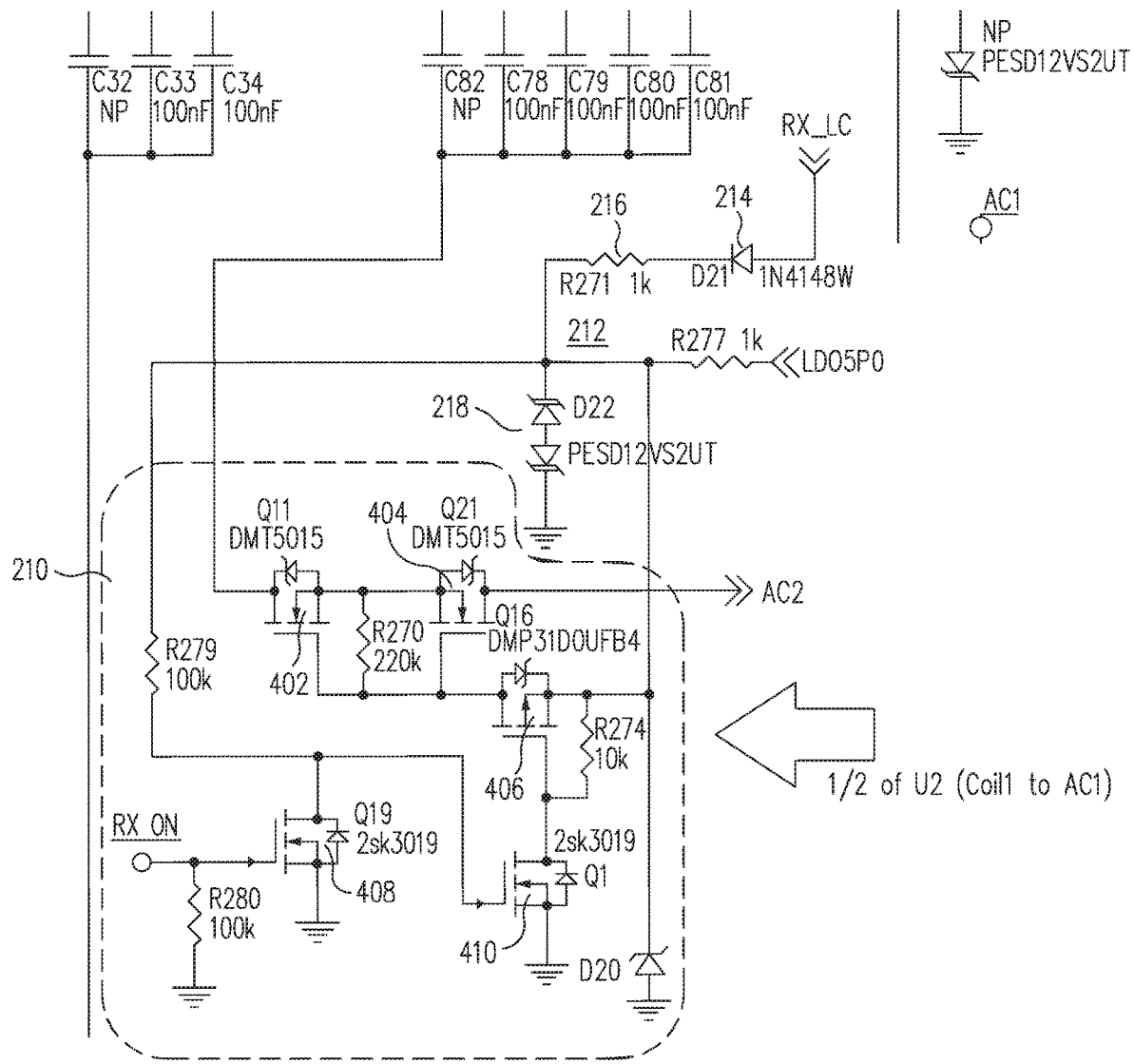
FIG. 4 illustrates an example of a switch between transmit and receive coils that can be used in the embodiment of FIG. 3.

FIG. 4 illustrates an example interaction between self-start circuit 212 and switch circuit 210. As illustrated in FIG. 4, switch circuit 210 includes FETs 402 and 404 that couples RX coil 208 to node AC2. FETs 402 and 404 are controlled by transistors 408, 410, and 406. During normal operation, where LDO provides a high voltage, transistors 402 and 404 are ON during wireless power receive mode and off otherwise. For example, in wireless power receive mode, the select signal RX_ON is asserted low (a default state) and transistor 408 is off, transistor 410 is turned on which turns on transistor 406, which turns on transistors 402 and 404. Alternatively, when RX_ON is high, transistor 408 is on and transistor 410 is off, turning transistor 406 off, which turns off transistor 402 and 404. As discussed above, if LDO is not supplying voltage, then transistors 402 and 404 cannot be turned on. However, when self-start circuit 212 is powered by RX coil 206, transistors 402 and 404 are turned ON to supply power from RX coil 206 to AC2.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power circuit, comprising:
a transmit coil coupled to a first node;
a receive coil coupled to the first node;
a switch circuit coupled to the transmit coil and the receive coil opposite the first node, the switch switching the transmit coil to a second node in a transmit mode and switching the receive coil to the second node in a receive mode;
a controller coupled to the first node and the second node, the controller coupled to provide signals to the switch circuit; and
a self-start circuit coupled to the receive coil, the self-start circuit providing power to the switch circuit to hold the switch circuit in the receive mode.

2. The wireless power circuit of claim 1, the switch circuit includes a transistor coupled between the receive coil and the second node, the transistor configured to conduct in the receive mode and not to conduct in the transmit mode.

3. The wireless power circuit of claim 2, wherein the transistor is powered to conduct by the self-start circuit.

4. The wireless power circuit of claim 2, wherein the transistor includes one or more FET transistors.

5. The wireless power circuit of claim 1, wherein the self-start circuit includes a first diode coupled to the receive coil to receive power and a second diode coupled in series with the first diode, the self-start circuit providing power from a node between the first diode and the second diode.

6. A method of operating a device, comprising:
switching to couple a receive coil to a receive circuit with a switch;
receiving power into the switch if a power source is available; and
providing power from a self-start circuit coupled to the receive coil if the power source is unavailable.

7. The method of claim 6, wherein the switch includes a transistor coupled between the receive coil and the second node, the transistor configured to conduct in the receive mode and not to conduct in the transmit mode.

8. The method of claim 7, wherein the transistor is powered to conduct by the self-start circuit.

9. The method of claim 7, wherein the transistor is an FET transistor.

10. The method of claim 6, wherein the self-start circuit includes a first diode coupled to the receive coil to receive power and a second diode coupled in series with the first diode, the self-start circuit providing power from a node between the first diode and the second diode.

* * * * *